March 6, 1934.   A. B. WEISSENBORN ET AL   1,949,593
WIRE FABRIC SEAM AND METHOD OF PRODUCING SAME
Filed July 14, 1932
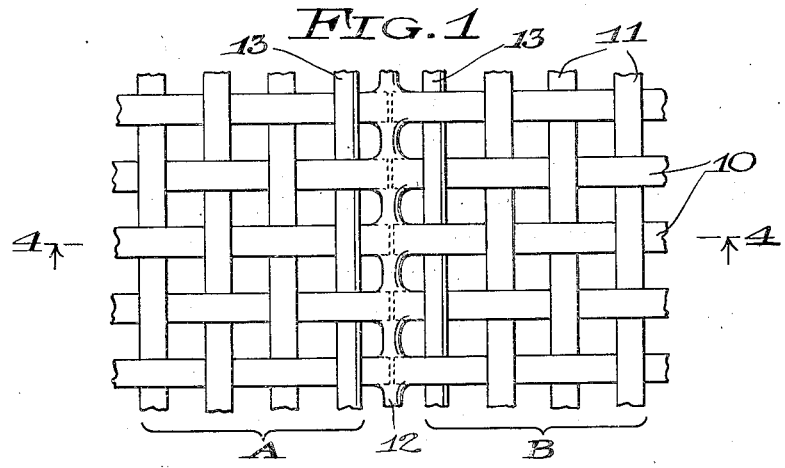
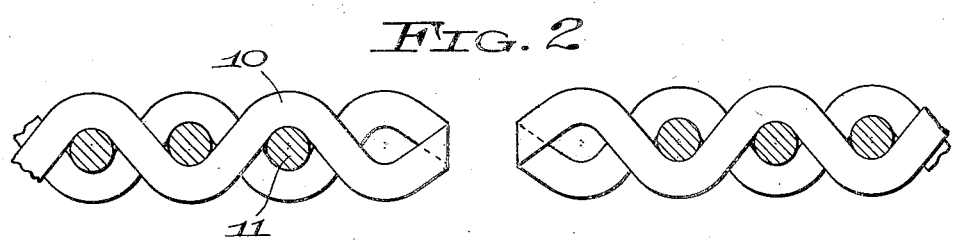
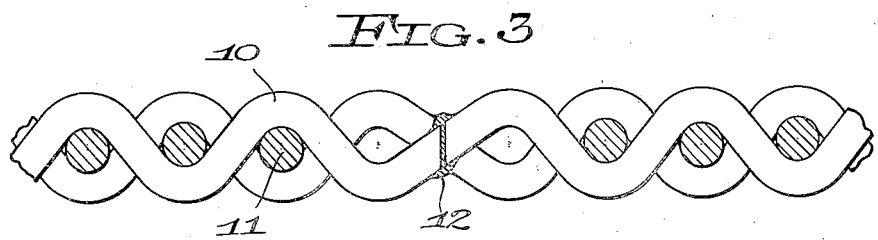
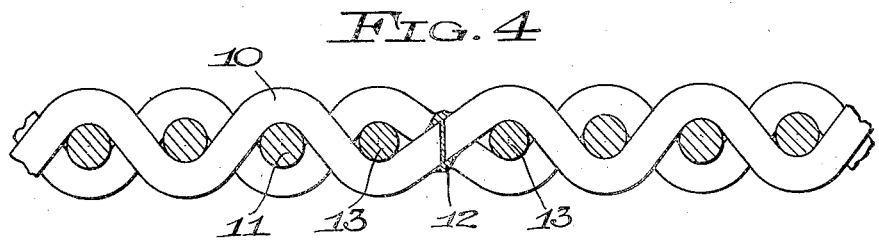
INVENTORS
Albert B. Weissenborn +
William E. Buchanan
By R. S. Caldwell
ATTORNEY
WITNESSES
L. E. Kilian
C. L. Naal Patented Mar. 6, 1934

1,949,593

UNITED STATES PATENT OFFICE 1,949,593

WIRE FABRIC SEAM AND METHOD OF PRODUCING SAME

Albert B. Weissenborn and William E. Buchanan, Appleton, Wis., assignors to Appleton Wire Works, Inc., Appleton, Wis., a corporation of Wisconsin Application July 14, 1932, Serial No. 622,472

6 Claims. (Cl. 245—10)

The invention relates to wire fabrics, such as Fourdrinier wires, and more particularly the seams therefor, and has for an object the provision of a soldered or brazed seam which is thin, narrow and uniform, which possesses strength and durability, and which will not interfere with proper drainage.

Another object of the invention is to provide a method of producing such seam wherein the warp ends of the fabric parts to be joined are soldered or brazed together after the end weft wires are removed, thus avoiding the need for excessive heat which would adversely affect the mechanical strength of the seam, insert wires of smaller diameter being substituted for the end weft wires after the soldering or brazing operation to insure proper drainage and to reduce the thickness of the seam.

The invention further consists in the several features hereinafter set forth and particularly defined by the annexed claims.

In the accompanying drawing, Fig. 1 is a plan view of a portion of a Fourdrinier wire embodying a seam constructed in accordance with the invention.

Fig. 2 is a longitudinal view of the adjacent parts of the Fourdrinier wire as they appear before being joined, the end weft wire in each part being removed.

Fig. 3 is a longitudinal sectional view of the parts having their edges soldered or brazed together and Fig. 4 is longitudinal sectional view of the wire fabric with the seam completed, taken along the line 4—4 of Fig. 1.

In this drawing, 10 indicates the warp wires of a Fourdrinier wire fabric and 11 the weft wires thereof, the two ends of the fabric to be joined being indicated by A and B, respectively. In trimming the ends of the fabric preparatory to forming the seam, the warp wires 10 of each fabric end are cut along a line parallel to the weft wires and at some distance from the last weft wire, which latter is then removed, leaving unoccupied terminal knuckles at the warp ends, as indicated in Fig. 2. The cut warp ends are disposed substantially midway between the surface planes of the fabric, as seen in Fig. 2. The fabric edges are then juxtaposed and the ends of the terminal knuckles of the warp wires are soldered or brazed together with a coating 12 of fusible metal, as seen in Fig. 3. The soldering or brazing may be done in any suitable manner, one method being disclosed in the application of William E. Buchanan, Serial No. 540,615: filed May 28, 1931. The warp ends of the two fabric parts A and B are shown to be in register, but it is not essential that they have this relation. The removal of the end weft wires decreases the mass of metal in the region of the joint and increases the air space, thus permitting a substantial reduction in the amount of heat required to produce a satisfactory joint. Weakening of the warp wires is thereby prevented, and very little fusible metal is required. The fusible metal 12 is shown in Fig. 1 to bridge the laterally adjacent warp wires and to be in the form of a thread substantially parallel to the weft wires and having the same order of thickness as the weft wires.

After the fabric edges are soldered or brazed, insert wires 13 of smaller diameter than the weft wires are threaded through the spaces or tunnels left within the knuckles of the warp ends by the removal of the end weft wires, thus providing mesh openings at the seam which have a size on the order of those in the body of the fabric so as to avoid variations in paper thickness at the region of the seam. The reduced size of the insert wires also decreases the thickness of the seam and renders the seam less liable to damage as it passes over the suction boxes. If desired, the seam may be rolled after the insert wires are in place.

The cut ends of the warp wires are covered by the fused metal, thus producing smoothly rounded surfaces on which pulp particles will not become lodged. The tensile strength of the seam is substantially as great as that of the body of the cloth.

What we claim as new and desire to secure by Letters Patent is:

1. The method of producing a seam in a wire fabric which comprises removing the end weft wire of each of the fabric parts to be joined, joining the warp ends of the fabric parts by a soldered connection, and replacing the removed end weft wires by insert wires after joining the warp ends.

2. The method of producing a seam in a wire fabric which comprises removing the end weft wire of each of the fabric parts to be joined, joining the warp ends of the fabric parts by a soldered connection, and replacing the removed end weft wires by insert wires of smaller diameter after joining the warp ends.

3. The method of producing a seam in a wire fabric which comprises cutting each of the fabric parts to be joined parallel to the weft wires and at a distance from the end weft wire, removing the end weft wire from each of the fabric parts, joining the warp ends of the fabric parts by a soldered connection, and replacing the removed end weft wires by insert wires after joining the warp ends.

4. The method of producing a seam in a wire fabric, which comprises trimming each fabric part to be joined to present warp knuckles thereon extending beyond the marginal weft wire thereof and forming a tunnel extending parallel to the weft wires, joining the ends of the knuckles of the fabric parts by a soldered connection, and threading an insert wire through each tunnel after joining the knuckle ends.

5. A wire fabric comprising fabric parts each having warp and weft wires and each having warp ends extending beyond the end weft wires and arranged approximately midway between the surface planes of the fabric, and a solder joint connecting the warp ends of the fabric parts and including a thread of fusible metal extending parallel to, but spaced from, the adjacent weft wires and bridging the warp ends of each fabric part.

6. A wire fabric comprising fabric parts each having warp and weft wires and each having warp ends extending beyond the end weft wire, and a solder-bearing strand interposed between and engaging the end faces of the warp wires of the two fabric parts and having a soldered connection with said end faces to unite the fabric parts, said strand being spaced from the end weft wires.

ALBERT B. WEISSENBORN.
WILLIAM E. BUCHANAN. [L. S.]